US008577485B2

(12) United States Patent
Liebchen

(10) Patent No.: US 8,577,485 B2
(45) Date of Patent: Nov. 5, 2013

(54) METHOD AND AN APPARATUS FOR PROCESSING AN AUDIO SIGNAL

(75) Inventor: Tilman Liebchen, Berlin (DE)

(73) Assignee: LG Electronics Inc., Seoul (KR)

( * ) Notice: Subject to any disclaimer, the term of this patent is extended or adjusted under 35 U.S.C. 154(b) by 778 days.

(21) Appl. No.: 12/734,018

(22) PCT Filed: Dec. 6, 2007

(86) PCT No.: PCT/KR2007/006307
§ 371 (c)(1),
(2), (4) Date: Apr. 5, 2010

(87) PCT Pub. No.: WO2009/072685
PCT Pub. Date: Jun. 11, 2009

(65) Prior Publication Data

US 2010/0235172 A1 Sep. 16, 2010

(51) Int. Cl.
*G06F 17/00* (2006.01)

(52) U.S. Cl.
USPC .......... 700/94

(58) Field of Classification Search
USPC .......... 700/94; 369/1-12; 704/500-504
See application file for complete search history.

(56) References Cited

U.S. PATENT DOCUMENTS

| | | | |
|---|---|---|---|
| 6,952,677 | B1 | 10/2005 | Absar et al. |
| 2007/0009031 | A1 | 1/2007 | Liebchen |
| 2007/0009233 | A1 | 1/2007 | Liebchen |

FOREIGN PATENT DOCUMENTS

| | | |
|---|---|---|
| CN | 1495705 | 5/2004 |
| CN | 101010724 | 8/2007 |
| EP | 1 768 451 | 3/2007 |
| JP | 2007-286146 | 11/2007 |
| JP | 2007-286200 | 11/2007 |
| JP | 2009-500681 | 1/2009 |
| WO | WO 2007/007999 | 1/2007 |
| WO | WO 2007/013775 | 2/2007 |

OTHER PUBLICATIONS

Office Action for corresponding Chinesee Application No. 200780100852.6 dated Oct. 23, 2012 and English translation thereof.
International Search Report.

(Continued)

*Primary Examiner* — Andrew C Flanders
(74) *Attorney, Agent, or Firm* — Harness, Dickey & Pierce, P.L.C.

(57) ABSTRACT

A method for processing an audio signal, comprising: receiving the audio signal; and processing the received audio signal, wherein the audio signal is processed according to a scheme comprising: comparing a size information of at least two blocks of A+1 level with a size information of a block of A level corresponding to the at least two of A+1 level; and, determining the at least two blocks of A+1 level as an optimum block if the size information of the at least two blocks of A+1 level is less than the size information of the block of A level is disclosed. A method for processing an audio signal, comprising: receiving the audio signal; and processing the received audio signal, wherein the audio signal is processed according to a scheme comprising: comparing a size information of a block of A level with a size information of at least two blocks of A+1 level; and, determining the block of A level as an optimum block if the size information of the block of A level is less than the size information of the at least two blocks of A+1 level is disclosed.

13 Claims, 14 Drawing Sheets

1

(56) References Cited

OTHER PUBLICATIONS

Tilman Liebchen et al., "The MPEG-4 audio lossless coding (ALS) standard- Technology and applications", AES 119$^{th}$ Convention paper, Oct. 7-10, 2005, New York, Whole Document.
Tilman Liebchen et al., "Improved Forward-Adaptive Prediction for MPEG-4 audio lossless coding", AES 118$^{th}$ Convention paper, May 28-31, 2005, Barcelona, Spain, Whole Document.
Dai Yang et al., "A lossless audio compression scheme with random access property", IEEE ICASSP 2004 Proceedings, May 17-21, 2004, Montreal, Canada, Whole Document.
Tilman Liebchen et al., "MPEG-4 audio lossless coding", AES 116$^{th}$ Convention paper, May 8-11, 2004, Berlin, Germany, Whole Document.
Tilman Liebchen, "MPEG-4 lossless coding for high-definition audio", AES 115$^{th}$ Convention paper, Oct. 10-13, 2003, New York, Whole Document.
Tilman Liebchen, "Lossless audio coding using adaptive multichannel prediction", AES 113$^{th}$ Convention paper, Oct. 5-8, 2002, Los Angeles, Whole Document.
Peter Noll et al., "Digital audio: from lossless to transparent coding", Proceedings IEEE Signal Processing Workshop, 1999, Poznan, Poland, pp. 53-60.
Tilman Liebchen, "Lossless transform coding of audio signals", AES 102$^{nd}$ Convention paper, Mar. 1997, Munich, Germany, pp. 22-25.
Search Report for corresponding European Application No. 07851278.7 dated Oct. 20, 2010.
Markus Erne and George Moschytz, "A Bit-Allocation Scheme for an Enbedded and Signal-Adaptive Audio Coder," AES, Feb. 2000, XP040371412.

| level | CASE A | CASE B | CASE C | CASE D | CASE E | CASE F |
|---|---|---|---|---|---|---|
| a=0(1st) | | | | | | |
| a=1(2nd) | | | | | | |
| a=2(3rd) | | | | | | |
| a=3(4th) | compare | compare | compare | compare | stop | stop |
| a=4(5th) | compare | compare (optional) | compare (optional) | compare | | |

METHOD AND AN APPARATUS FOR PROCESSING AN AUDIO SIGNAL

TECHNICAL FIELD

The present invention relates to a method and an apparatus for processing an audio signal, and more particularly, to a method and an apparatus for encoding an audio signal.

BACKGROUND ART

Storing and replaying of audio signals has been accomplished in different ways in the past. For example, music and speech have been recorded and preserved by phonographic technology (e.g., record players), magnetic technology (e.g., cassette tapes), and digital technology (e.g., compact discs). As audio storage technology progresses, many challenges need to be overcome to optimize the quality and storability of audio signals.

For the archiving and broadband transmission of music signals, lossless reconstruction is becoming a more important feature than high efficiency in compression by means of perceptual, there is a demand for an open and general compression scheme among content-holders and broadcasters. In response to this demand, a new lossless coding scheme has been considered. Lossless audio coding permits the compression of digital audio data without any loss in quality due to a perfect reconstruction of the original signal.

DISCLOSURE

Technical Problem

However, in a lossless audio coding method, encoding takes too much time, requires a large amount of resources, and has very high complexity.

Technical Solution

Accordingly, the present invention is directed to a method and an apparatus for processing an audio signal that substantially obviates one or more problems due to limitations and disadvantages of the related art.

An object of the present invention is to provide a method and an apparatus for a lossless audio coding to permit the compression of digital audio data without any loss in quality due to a perfect reconstruction of the original signal.

Another object of the present invention is to provide a method and an apparatus for a lossless audio coding to reduce encoding time, computing resource and complexity.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Advantageous Effects

The present invention provides the following effects or advantages.

First of all, the present invention is able to provide a method and an apparatus for a lossless audio coding to reduce encoding time, computing resource and complexity.

Secondly, the present invention is able to speed-up in the block switching process of audio lossless coding.

Thirdly, the present invention is able to reduce complexity and computing resource in the long-term prediction process of audio lossless coding.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE

Figure 1:
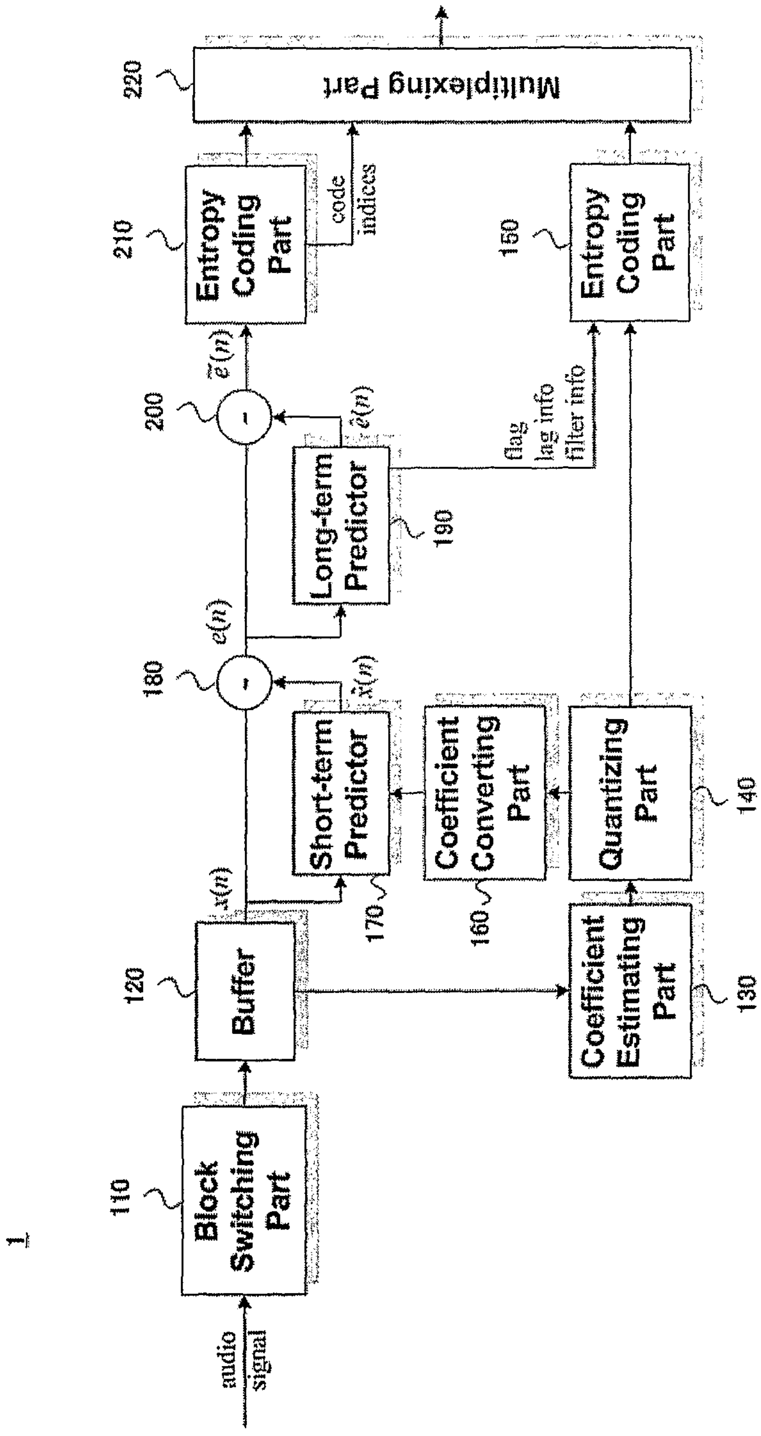
FIG. 1 is an exemplary illustration of an encoder 1 according to the present invention.

To achieve these objects and other advantages and in accordance with the purpose of the invention, as embodied and broadly described herein, a method for processing an audio signal, includes receiving the audio signal; and, processing the received audio signal; wherein the audio signal is processed according to a scheme comprising: comparing a size information of at least two blocks of A+1 level with a size information of a block of A level corresponding to the at least two of A+1 level; and, determining the at least two blocks of A+1 level as an optimum block if the size information of the at least two blocks of A+1 level is less than the size information of the block of A level, wherein the audio signal is divisible into blocks with several levels to be a hierarchical structure.

In another aspect of the present invention, a method for processing an audio signal, includes receiving the audio signal; and, processing the received audio signal; wherein the audio signal is processed according to a scheme comprising: comparing a size information of at least two blocks of A+1 level with a size information of a block of A level throughout a frame of the audio signal; and, determining the at least two blocks of A+1 level as an optimum block if all the size information of the at least two blocks of A+1 level is less than the size information of the block of A level corresponding to the at least two blocks of A+1 level included in the frame.

In another aspect of the present invention, a method for processing an audio signal, includes receiving the audio signal; and, processing the received audio signal; wherein the audio signal is processed according to a scheme comprising: comparing a size information of a block of A level with a size information of at least two blocks of A+1 level; comparing a size information of a block of A+1 level with a size information of at least two blocks of A+2 level; and, determining the block of A level as an optimum block if the size information of the block of A level is less than the size information of the at least two blocks of A+1 level and the size information of the at least four blocks of A+2 level.

In another aspect of the present invention, a method for processing an audio signal, includes receiving the audio signal; and, processing the received audio signal; wherein the audio signal is processed according to a scheme comprising: comparing a size information of a block of A level with a size information of at least two blocks of A+1 level; and, determining the block of A level as an optimum block if the size information of the block of A level is less than the size information of the at least two blocks of A+1 level.

In another aspect of the present invention, a method for processing an audio signal, includes receiving the audio signal; and, processing the received audio signal; wherein the audio signal is processed according to a scheme comprising: comparing a size information of a block of A level with a size information of at least two blocks of A+1 level corresponding to the block of A level throughout a frame of the audio signal; and, determining the block of A level as an optimum block if all the size information of the block of A level is less than the size information of the at least two blocks of A+1 level corresponding to the block of A level included in the frame.

In another aspect of the present invention, an apparatus for processing an audio signal, includes a initial comparing part comparing a size information of at least two blocks of A+1 level with a size information of a block of A level corresponding to the at least two of A+1 level; and, a conditional comparing part determining the at least two blocks of A+1 level as an optimum block if the size information of the at least two blocks of A+1 level is less than the size information of the block of A level, wherein the audio signal is divisible into blocks with several levels to be a hierarchical structure.

In another aspect of the present invention, an apparatus for processing an audio signal, includes receiving the audio signal; and, processing the received audio signal; wherein the audio signal is processed according to a scheme comprising: an initial comparing part comparing a size information of a block of A level with a size information of at least two blocks of A+1 level; and, a conditional comparing part determining the block of A level as an optimum block if the size information of the block of A level is less than the size information of the at least two blocks of A+1 level.

In another aspect of the present invention, a method for processing an audio signal, includes receiving the audio signal; and, processing the received audio signal; wherein the audio signal is processed according to a scheme comprising: comparing a size information of at least two blocks of A+1 level with a size information of a block of A level corresponding to the at least two of A+1 level; determining the at least two blocks of A+1 level as an optimum block if the size information of the at least two blocks of A+1 level is less than the size information of the block of A level, determining a lag information based on autocorrelation function value of the audio signal including the optimum block; and, estimating a long-term prediction filter information based on the lag information.

In another aspect of the present invention, an apparatus for processing an audio signal, includes a initial comparing part comparing a size information of at least two blocks of A+1 level with a size information of a block of A level corresponding to the at least two of A+1 level; a conditional comparing part determining the at least two blocks of A+1 level as an optimum block if the size information of the at least two blocks of A+1 level is less than the size information of the block of A level, a lag information determining part determining a lag information based on autocorrelation function value of the audio signal including the optimum block; and, a filter information estimating part estimating a long-term prediction filter information based on the lag information.

It is to be understood that both the foregoing general description and the following detailed description of the present invention are exemplary and explanatory and are intended to provide further explanation of the invention as claimed.

MODE FOR INVENTION

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

In a lossless audio coding method, since the encoding process has to be perfectly reversible without data loss, several parts of both encoder and decoder have to be implemented in a deterministic way.

[Structure of Codec]

FIG. 1 is an exemplary illustration of an encoder 1 according to the present invention. Referring to FIG. 1, a block switching part 110 can be configured to partition inputted audio signal into frames. The inputted audio signal may be received as broadcast or on a digital medium. Within a frame, there may be a plurality of channels. Each channel may be further divided into blocks of audio samples for further processing.

A buffer 120 can be configured to store block and/or frame samples partitioned by the block switching part 110. A coefficient estimating part 130 can be configured to estimate an optimum set of coefficient values for each block. The number of coefficients, i.e., the order of the predictor, can be adaptively chosen. In operation, the coefficient estimating part 130 calculates a set of PARCOR (Partial Autocorrelation)(hereinafter 'PARCOR') values for the block of digital audio data. The PARCOR value indicates PARCOR representation of the predictor coefficient. Thereafter, a quantizing part 140 can be configured to quantize the set of PARCOR values acquired through the coefficient estimating part 130.

A first entropy coding part 150 can be configured to calculate PARCOR residual values by subtracting offset value from the PARCOR value, and encode the PARCOR residual values using entropy codes defined by entropy parameters. Here, the offset value and the entropy parameters are chosen from an optimal table which is selected from a plurality of tables based on a sampling rate of the block of digital audio data. The plurality of tables can be predefined for a plurality of sampling rate ranges for optimal compression of the digital audio data for transmission.

A coefficient converting part 160 can be configured to convert the quantized PARCOR values into linear predictive coding (LPC) coefficients. In addition, a short-term predictor 170 can be configured to estimate current prediction value from the previous original samples stored in the buffer 120 using the linear predictive coding coefficients.

Furthermore, a first subtractor 180 can be configured to calculate a prediction residual of the block of digital audio data using an original value of digital audio data stored in the buffer 120 and a prediction value estimated in the short-term predictor 170. A long-term predictor 190 can be configured to estimate a lag information $\tau$ and LTP filter information $\gamma_j$, and sets a flag information indicating whether long-term prediction is performed, and generates long-term predictor $\hat{e}(n)$ using the lag information and LTP filter information A second subtractor 200 can be configured to estimate a new residual $\tilde{e}(n)$ after long-term prediction using the current prediction value e(n) and the long-term predictor $\hat{e}(n)$. Details of the long-term predictor 190 and the second subtractor 200 are explained with reference to FIG. 13 and FIG. 14.

A second entropy coding part 210 can be configured to encode the prediction residual using different entropy codes and generate code indices. The indices of the chosen codes have to be transmitted as side (or subsidiary) information.

The second entropy coding part 210 of the prediction residual provides two alternative coding techniques with different complexities. One is Golomb-Rice coding (herein after simply "Rice code") method and the other is Block Gilbert-Moore Codes (herein after simply "BGMC") method. Besides low complexity yet efficient Rice code, the BGMC arithmetic coding scheme offers even better compression at the expense of a slightly increased complexity.

Lastly, a multiplexing part 220 can be configured to multiplex coded prediction residual, code indices, coded PARCOR residual values, and other additional information to form the compressed bitstream. The encoder 1 also provides a cyclic redundancy check (CRC) checksum, which is supplied mainly for the decoder to verify the decoded data. On the encoder side, the CRC can be used to ensure that the compressed data are losslessly decodable. In other words, the CRC can be used to decode the compressed data without loss.

Additional encoding options comprise flexible block switching scheme, random access, and joint channel coding. The encoder 1 may use any of these options to offer several compression levels with different complexities. The joint channel coding is used to exploit dependencies between channels of stereo or multi-channel signals. This can be achieved by coding the difference between two channels in the segments where this difference can be coded more efficiently than one of the original channels.

Figure 2:
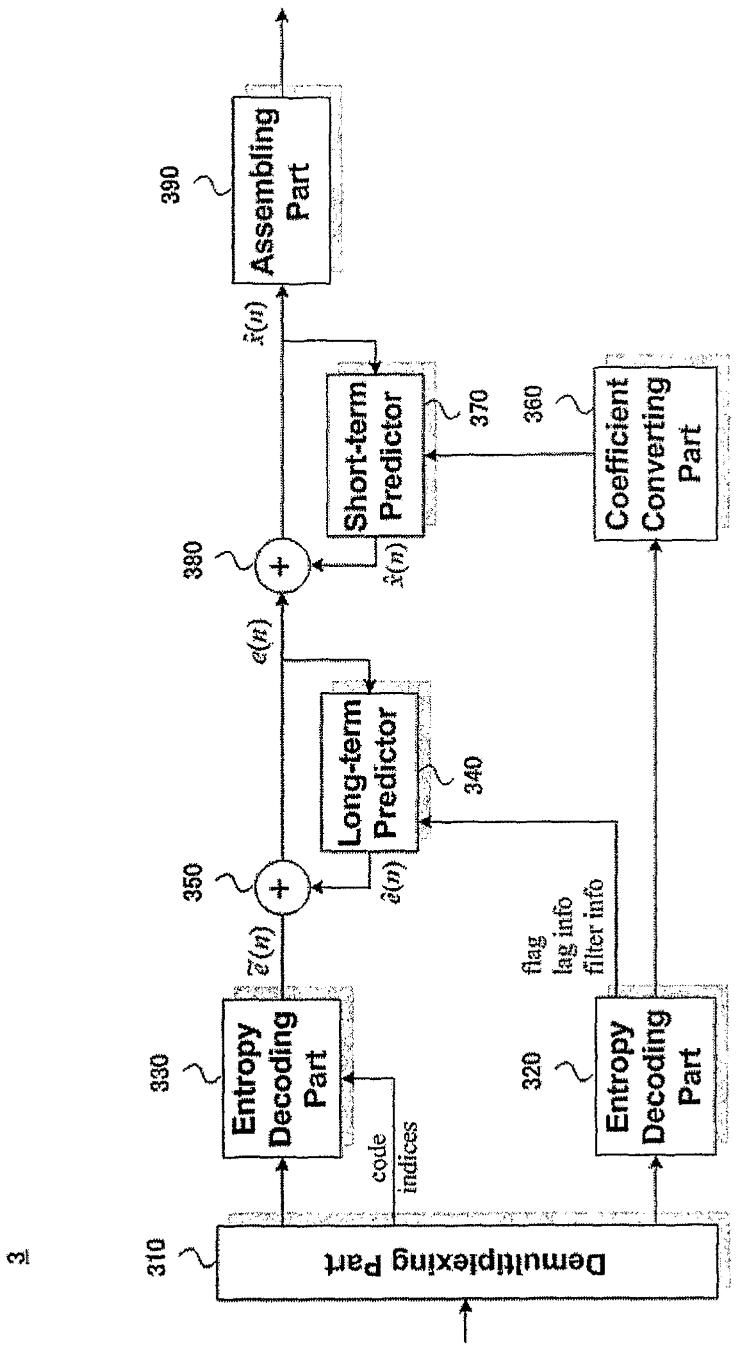
FIG. 2 is an exemplary illustration of a decoder 3 according to the present invention.

FIG. 2 is an exemplary illustration of a decoder 3 according to the present invention. More specially, FIG. 2 shows the lossless audio signal decoder which is significantly less complex than the encoder since no adaptation has to be carried out.

A demultiplexing part 310 can be configured to receive an audio signal via broadcast or on a digital medium and demultiplex a coded prediction residual of a block of digital audio data, code indices, coded PARCOR residual values, and other additional information.

A first entropy decoding part 320 can be configured to decode the PARCOR residual values using entropy codes defined by entropy parameters and calculate a set of PARCOR values by adding offset values with the decoded PARCOR residual values. Here, the offset value and the entropy parameters are chosen from a table, which is selected by an encoder from a plurality of tables, based on a sampling rate of the block of digital audio data.

A second entropy decoding part 330 can be configured to decode the demultiplexed coded prediction residual using the code indices. A long-term predictor 340 can be configured to estimate a long-term predictor using the lag information and LPT filter information. Furthermore, a first adder 350 can be configured to calculate the short-term LPC residual e(n) using the long-term predictor $\hat{e}(n)$ and the residual $\tilde{e}(n)$.

A coefficient converting part 360 can be configured to convert the entropy decoded PARCOR value into LPC coefficients. Moreover, a short-term predictor 370 can be configured to estimate a prediction residual of the block of digital audio data using the LPC coefficients. A second adder 380 can then be configured to calculate a prediction of digital audio data using short-term LPC residual e(n) and short-term predictor. Lastly, an assembling part 390 can be configured to assemble the decoded block data into frame data.

As discussed, the decoder 3 can be configured to decode the coded prediction residual and the PARCOR residual values, convert the PARCOR residual values into LPC coefficients, and apply the inverse prediction filter to calculate the lossless reconstruction signal. The computational effort of the decoder 3 depends on the prediction orders chosen by the encoder 1. In most cases, real-time decoding is possible even in low-end systems.

Figure 3:
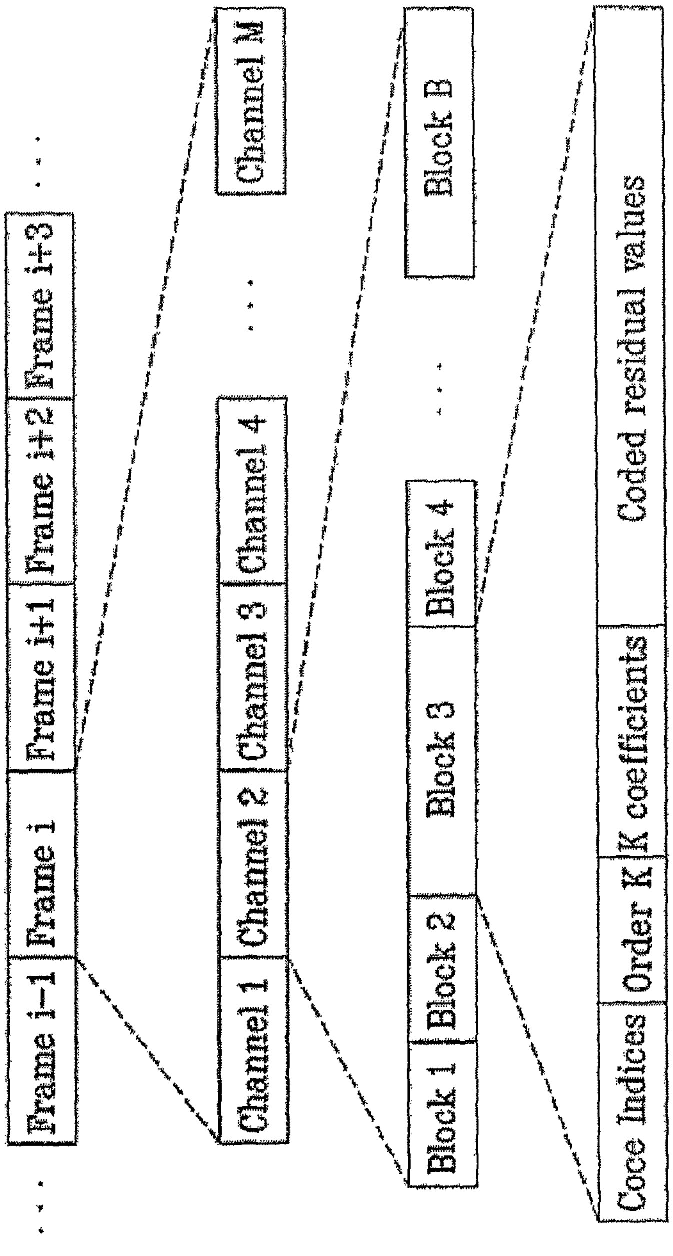
FIG. 3 is an exemplary illustration of a bitstream structure of a compressed audio signal including a plurality of channels (e.g., M channels) according to the present invention.

FIG. 3 is an exemplary illustration of a bitstream structure of a compressed audio signal including a plurality of channels (e.g., M channels) according to the present invention.

The bitstream consists of at least one audio frame which includes a plurality of channels (e.g., M channels). Each channel is divided into a plurality of blocks using the block switching scheme according to present invention, which will be described in detail later. Each divided blocks has different sizes and includes coding data according to FIG. 1. For example, the coding data within divided blocks contain the code indices, the prediction order K, the predictor coefficients, and the coded residual values. If joint coding between channel pairs is used, the block partition is identical for both channels, and blocks are stored in an interleaved fashion. Otherwise, the block partition for each channel is independent.

Hereinafter, the block switching and long-term prediction will now be described in detail with reference to the accompanying drawings that follow.

[Block Switching]

Figure 4:
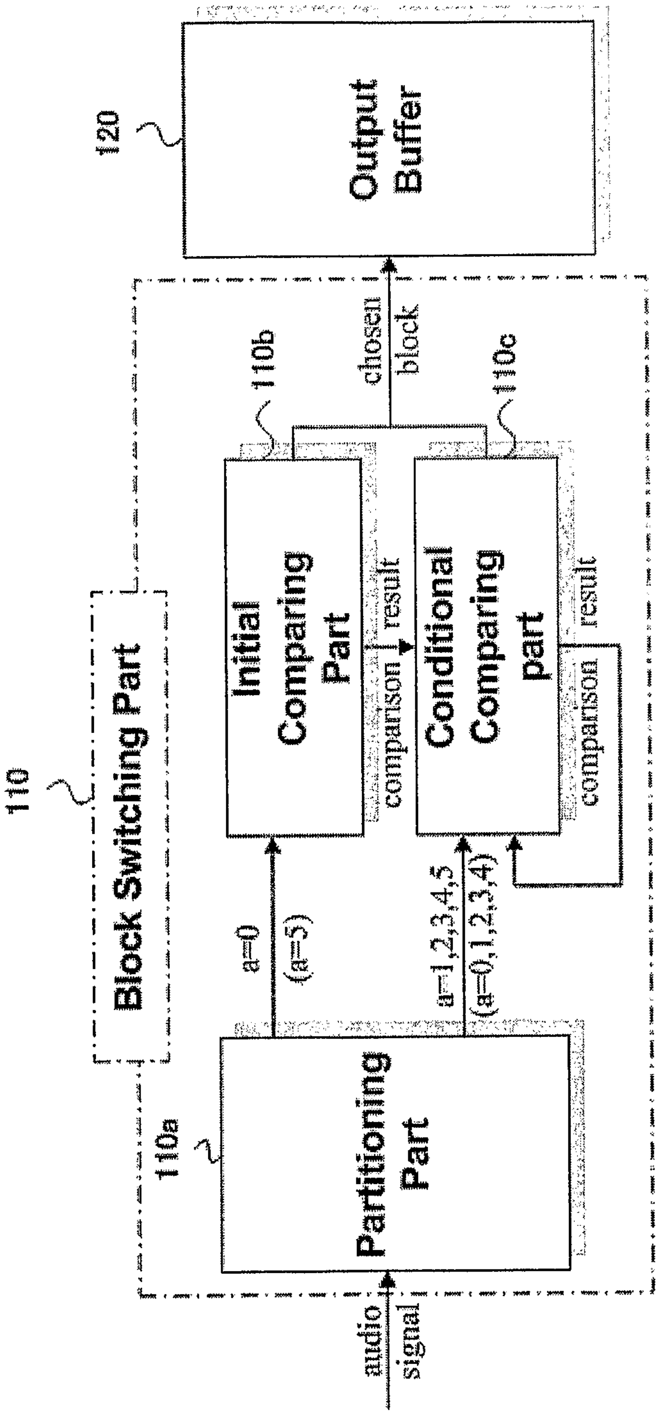
FIG. 4 is an exemplary block diagram of a block switching apparatus for processing an audio signal according to a first embodiment of the present invention.

FIG. 4 is an exemplary block diagram of a block-switching apparatus for processing an audio signal according to embodiment of the present invention. As shown in FIG. 4, the apparatus for processing an audio includes a block switching part 110 and a buffer 120. More specifically, the partitioning part 110 includes a partitioning part 110*a*, an initial comparing part 110*b*, and conditional comparing part 110*c*. The partitioning part 110*a* can be configured to divide each channel of a frame into a plurality of blocks and may be identical to the switching part 110 mentioned previously with reference to FIG. 1. Furthermore, the buffer 120 for storing the block partition chosen by the block switching part 110 may be identical to the buffer 120 mentioned previously with reference to FIG. 1.

Details and processes of the partitioning part 110*a*, the initial comparing part 110*b*, and the conditional comparing part 110*c* can be referred to as "bottom-up method" and/or "top-down method."

Figure 5:
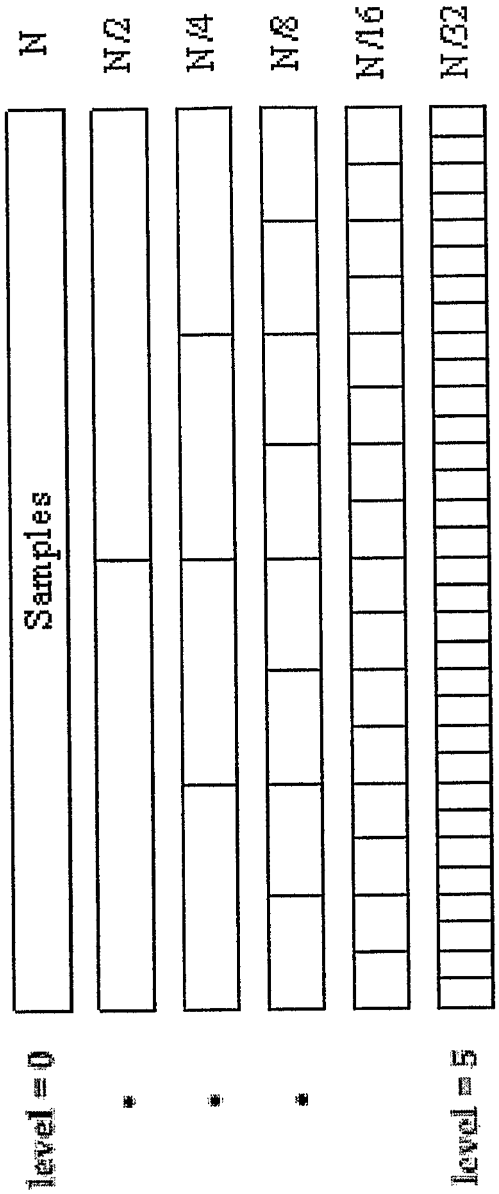
FIG. 5 is an exemplary illustration of a conceptual view of a hierarchical block partitioning method according to the present invention.

First, the partitioning part 110*a* can be configured to partition hierarchically each channel into a plurality of blocks. FIG. 5 is an exemplary illustration of a conceptual view of a hierarchical block partitioning method according to the present invention.

FIG. 5 illustrates a method of hierarchically dividing one frame into 2 to 32 blocks (e.g., 2, 4, 8, 16, and 32). When a plurality of channels is provided in a single frame, each channel may be divided (or partitioned) up to 32 blocks. As shown, the divided blocks for each channel configure a frame. For example, referring to level=5, a frame is divided into 32 blocks. Furthermore, as described above, the prediction and entropy coding can be performed in the divided block units.

Figure 6:
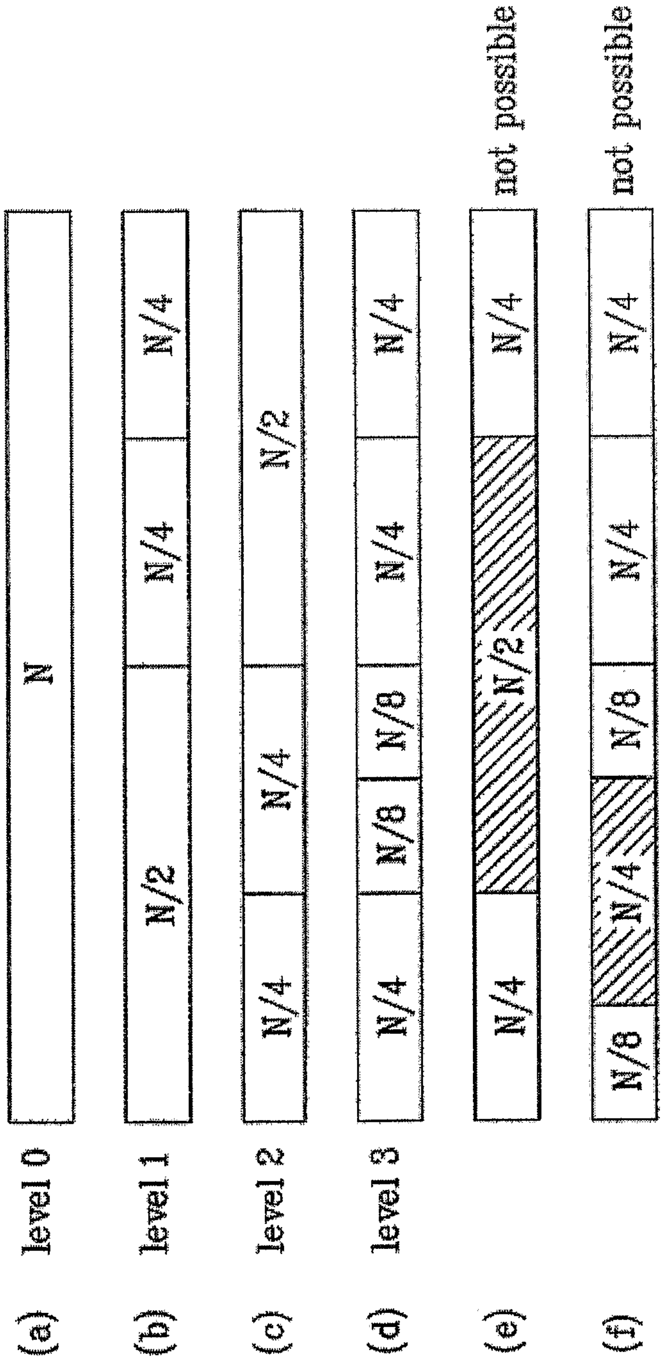
FIG. 6 is an exemplary illustration of a variable combination of block partitions according to the present invention.

FIG. 6 is an exemplary diagram illustrating various combination of partitioned blocks according to the present invention. As shown in FIG. 6, partitioning of arbitrary combinations of blocks with $N_B$=N, N/2, N/4, N/8, N/16, and N/32 may be possible within a frame, as long as each block results from a division of a super-ordinate block of double length. That is, the block length of the highest level is equal to 32 multiple of block length of the lowest level.

For example, as illustrated in the example of FIG. 5, a frame can be partitioned into N/4+N/4+N/2, while a frame may not be partitioned into N/4+N/2+N/4 (e.g., (e) and (f) shown in FIG. 6). The block switching method relates to a process for selecting suitable block partition(s). Hereinafter, the block switching method according to the present invention will be referred to as "bottom-up method" and "top-down method".

Bottom-Up Method

Figure 7:
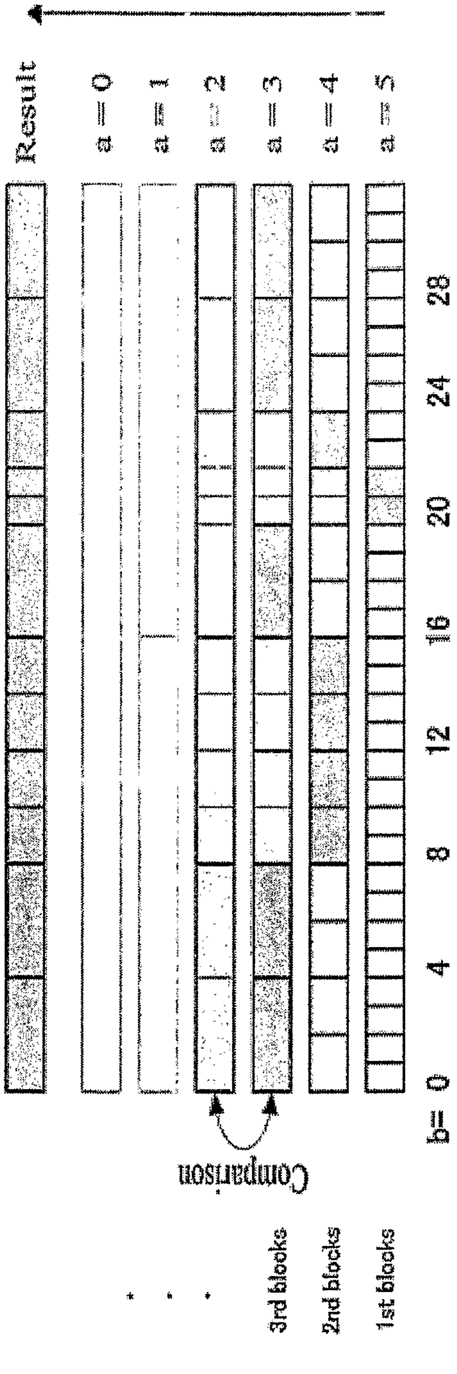
FIG. 7 is an exemplary diagram to explain a concept of a block switching method for processing an audio signal according to one embodiment of the present invention.
Figure 8:
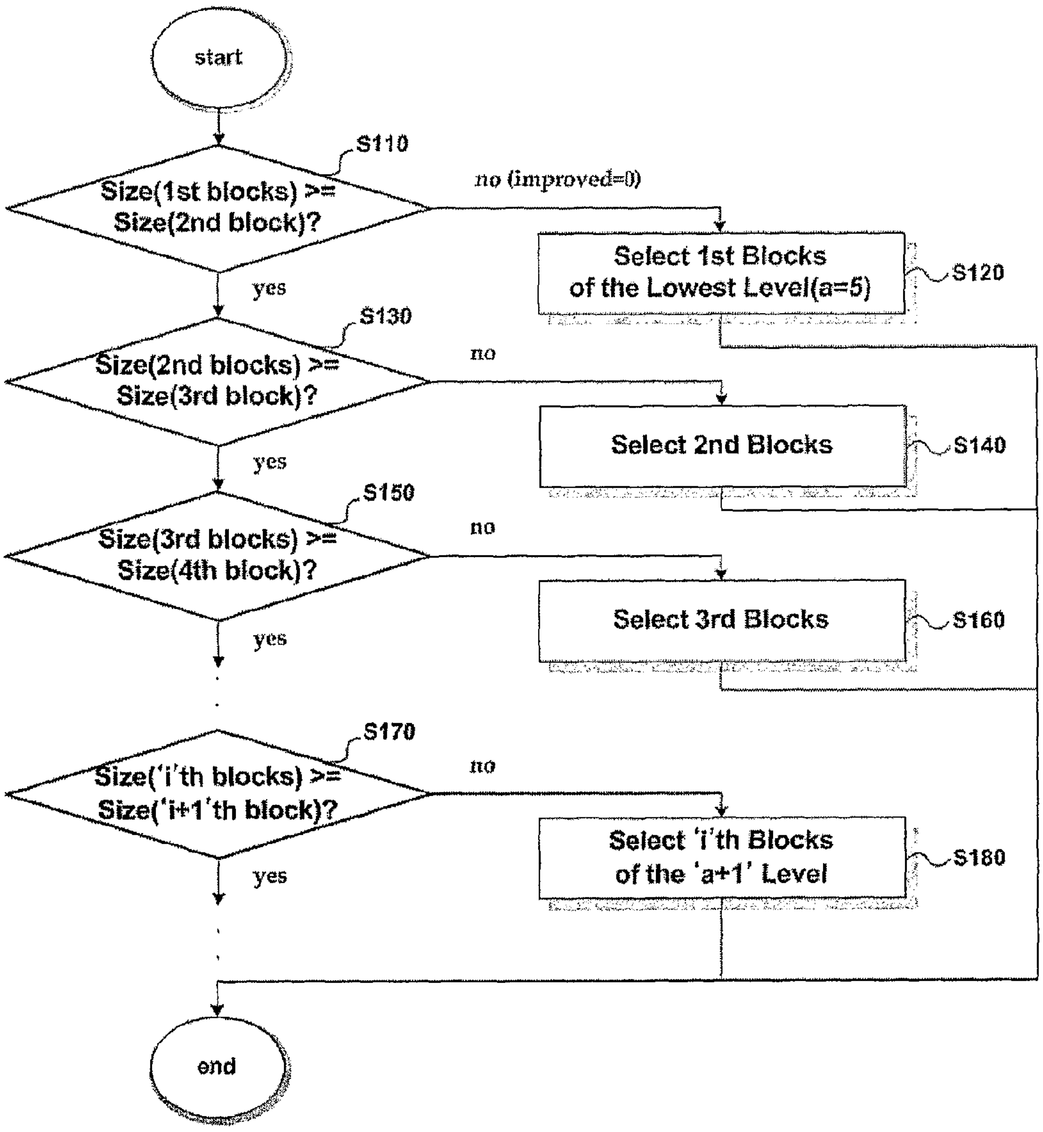
FIG. 8 is an exemplary flowchart of a block switching method for processing an audio signal according to one embodiment of the present invention.

FIG. 7 is an exemplary diagram to explain a concept of a block-switching method for processing an audio signal according to an embodiment of the present invention. FIG. 8 is an exemplary flowchart of a block-switching method for processing an audio signal according to an embodiment of the present invention.

Referring to FIG. 7, for each of the six levels, a=0 . . . 5, an audio frame of N sample is divided into $B=2^a$ blocks of length $N_B=N/B=N/2^a$. Here, level a=0 is considered the highest or top level, and Level a=5 is considered the lowest or bottom level. Furthermore, with respect to the bottom-up method, $1^{st}$ blocks corresponds to the lowest level, $2^{nd}$ blocks correspond to the next higher level (a=4) to the lowest level, $3^{rd}$ blocks correspond to the next higher level (a=3) to the $2^{nd}$ blocks, and so forth. In some cases, $1^{st}$ blocks, $2^{nd}$ blocks, and $3^{rd}$ blocks may be applied to blocks with the level a=4 to the level a=2, the level a=3 to the level a=1, or the level a=2 to the level a=0.

All blocks for one level (or in the same level) are fully encoded, and the coded blocks are temporarily stored together with their individual size S (in bits). The size S corresponds to one of a coding result, a bit size, and a coded data block. The encoding is performed for each level, resulting in a value S(a,b), b=0 . . . B−1, for each block in each level. In some cases, block(s) to be skipped may not need to be encoded.

Then, starting at the lowest level a=5, two contiguous blocks can be compared to at least one block of the higher level a=4. That is, the bit sizes of the two contiguous blocks of level a=5 is compared to the bit size of the corresponding block to determine which block(s) require(s) less. Here, the corresponding block refers to the block size in terms of partitioned length/duration. For example, the initial two contiguous blocks (starting from left) of the lowest level a=5 corresponds to the initial block (from the left) of the second lowest level a=4.

Referring to FIG. 4 and FIG. 8, the initial comparing part 110*b* compares a bit sizes of two $1^{st}$ blocks (at bottom level) with a bit size of a $2^{nd}$ block (S110). A bit size of two $1^{st}$ blocks may be equal to a sum a size of one $1^{st}$ block and a size of another $1^{st}$ block. In case that bottom level is a=5, the comparison in the step S110 is represented as the following Formula 1.

$$S(5,2b)+S(5,2b+1)>=S(4,b) \quad \text{[Formula 1]}$$

If the bit size of two $1^{st}$ blocks is less than the bit size of a $2^{nd}$ block ('no' in step S110), the initial comparing part 110*b* selects two $1^{st}$ blocks of the lowest level (S120). In other words, the two $1^{st}$ blocks are stored in a buffer 120 and the $2^{nd}$ block is not stored in the buffer 120 and deleted in a temporary working buffer in the step S120, since there is no improvement compared to the $2^{nd}$ block in terms of bitrates. After step S120, comparison and selection is stopped and no longer performed for the corresponding blocks at the next level.

Alternatively, if the bit size of two $1^{st}$ blocks is equal to or greater than the bit size of a $2^{nd}$ block ('yes' in S110 step), the conditional comparing part 110*c* compares a bit size of two $2^{nd}$ blocks with a bit size of a $3^{rd}$ block (S130). In some cases, in step S110, if at least one of the bit size of two $1^{st}$ blocks is less than the bit size of a $2^{nd}$ block corresponding the two $1^{st}$ blocks among all blocks (b=0 . . . B) of the one level, step S130 may be performed. This modified condition may be applied to the following steps S150 and S170. If the bit size of two $2^{nd}$ blocks is less than the bit size of $3^{rd}$ block ('no' in step S130), the conditional comparing part 110*c* selects two $2^{nd}$ blocks (S140). In the step S140, the two short blocks from level 5 are substituted by the long blocks in level 4. After step S140, comparison and selection processing is aborted.

Similar to steps S130 and S140, comparison of $3^{rd}$ blocks of level a=3 and $4^{th}$ block of level a=2 is performed (S150), and choice is performed based on the comparison results (S160). In general, the conditional comparing part 110*c* a bit size of two $i^{th}$ blocks with a bit size of an $i+1^{th}$ block only if the bit size of two $i^{th}$ blocks (at level a=a+1) is equal to or greater than the bit size of $i+1^{th}$ block (at level a=a) (S170), and choose suitable block(s) or compare for the next level according to the comparison results (S180). Step S170 is represented as the following Formula 2. Step S170 may be repeated until the highest level (a=0) is reached.

$$S(a+1,2b)+S(a+1,2b+1)>=S(a,b), \quad \text{[Formula 2]}$$

where a=0 . . . 5, b=0 . . . B−1,

'a+1' corresponds to level of $i^{th}$ block, 'a' corresponds to level of $i+1^{th}$ block.

Referring in FIG. 7 again, the blocks that are chosen as suitable blocks are shown in dark grey, the blocks that do not benefit from further mergence are shown in light grey, and the blocks that have to be processed are shown in white. In addition, the blocks that need not or are not used are shown in grey (or semi-transparent) which shows that the processes of comparing can be omitted. From level a=3 to level a=1, there is no improvement, hence the higher levels a=1 and a=0 need not be processed. Finally, blocks of level a=3 are chosen at b=0 . . . 7, blocks of level a=4 are chosen at b=8 . . . 15, . . . , blocks of level a=5 are chosen at b=20-21, the rest can be omitted.

The step S110 to the step S180 is implemented by the following C-style pseudo code 1, which does not put limitation on the present invention. In particular, the pseudo code 1 is implemented according the modified condition mentioned above.

[pseudo code 1]

```
for (a = 5; a <= 0; a--) { // for all levels
      B = 1 << a;              // block length in level a
      for (b = 0; b < B; b++) {// for all blocks
            size[a][b] = EncodeBlock(x+b*B, buf[a][b]);// encode block and store in buf
      }
      if (a < 5) {             // if not lowest level
            improved = 0;
            for (b = 0; b < B; b++) {// compare size of current block with size of two blocks in
level a+1
            if (size[a][b] > size[a+1][2*b] + size[a+1][2*b+1]) {// copy two short blocks from
level a+1 into the long block of level a
                  memcpy(buf[a][b], buf[a+1][2*b], size[a+1][2*b]);
                  memcpy(buf[a][b] + size[a+1][2*b], buf[a+1][2*b+1], size[a+1][2*b+1]);
                  size[a][b] = size[a+1][2*b] + size[a+1][2*b+1];    // update size of new
long block
                  }
                  else
                  improved = 1;          // improvement by longer blocks
                  }
                  if (!improved)
                        break;          // stop iteration at level a
            }
      }
```

Top-Down Method

Figure 9:
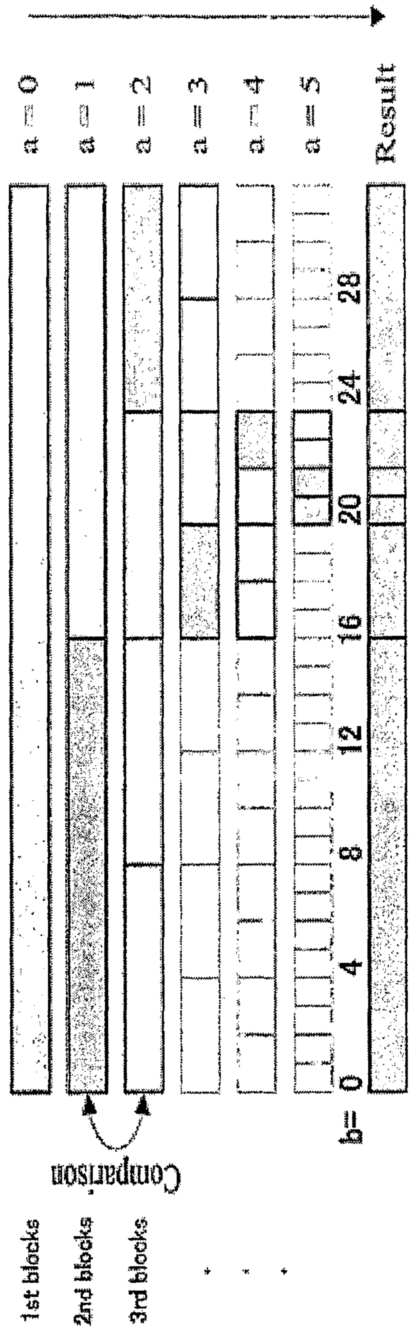
FIG. 9 is an exemplary diagram to explain a concept of a method for processing an audio signal according to another embodiment of the present invention.
Figure 10:
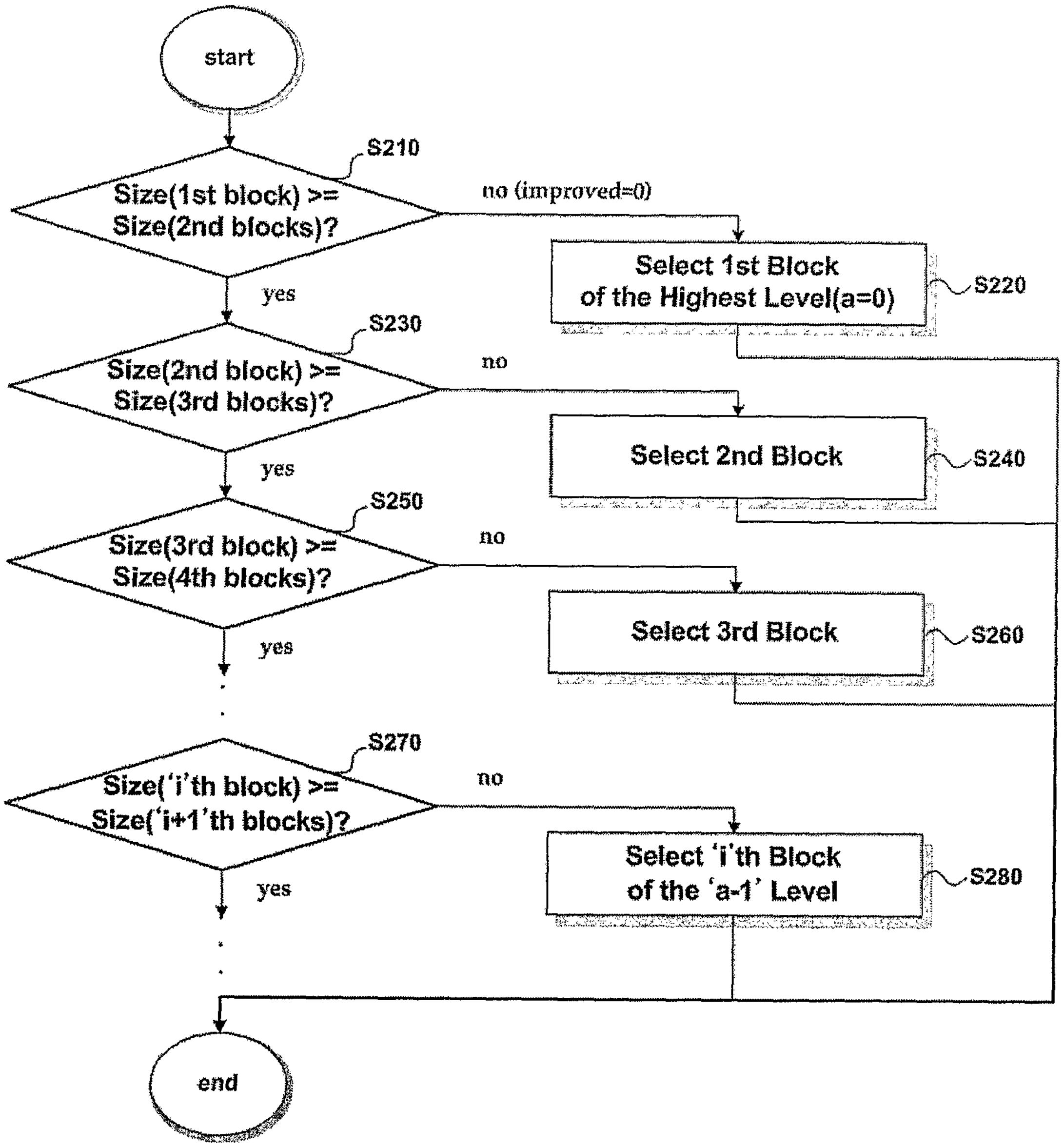
FIG. 10 is an exemplary flowchart of a block switching method for processing an audio signal according to another embodiment of the present invention.

FIG. 9 is an exemplary diagram to explain a concept of a block-switching method for processing an audio signal according to another embodiment of the present invention. FIG. 10 is an exemplary flowchart of a block-switching method for processing an audio signal according to another embodiment of the present invention. Referring FIG. 9, like the bottom-up method, for each of the six levels a=0 . . . 5, an audio frame of N sample is divided into $B=2^a$ blocks of length $N_B=N/B=N/2^a$. In contrast to the bottom-up method, with respect to the top-down method, 1st blocks correspond to the highest level (a=0), 2nd blocks correspond to the next level (a=1) of the highest level, 3rd blocks correspond to the next level (a=2) of 2nd blocks, which does no put limitation on the pre sent invention. In some cases, 1st blocks, 2nd blocks, and 3rd blocks may be applied to blocks with the level a=1 to the level a=3, the level a=2 to the level a=4, or the level a=3 to the level a=5.

The top-down method is identical to the bottom-up method that the search is aborted at the point where the next level does not result in an improvement, with the exception that starts at the top level (a=0) and the proceeds towards lower level. At each level 'a', the size of one block in compared to the two corresponding blocks of the lower level a+1. If those two short blocks need less bits, the longer block of level 'a' is substituted (i.e. virtually divided), and the algorithm proceeds to level a+1. Otherwise, if the long block needs less bits, the adaptation is terminated an more in lower levels.

Referring to FIG. 4 and FIG. 10, the initial comparing part **110*b* compares a bit size of a 1st block (at the top level) with a bit size of two 2nd blocks (S210). A bit size of two 2nd blocks may be equal to a sum a size of one 2nd block and a size of another 2nd block. In case that the top level is a=0, the comparison in the step S210** is represented as the following Formula 3.

$$S(0,b/2)>=S(1,b)+S(1,b+1) \qquad \text{[Formula 3]}$$

Like the foregoing the step S120, if the bit size of a 1st block is less than the bit size of two 2nd blocks ('no' in step S110), the initial comparing part **110*b* selects two 1st blocks of the highest level (S220). Otherwise, i.e., if the bit size of a 1st block is equal to or greater than the bit size of two 2nd blocks ('yes' in S210 step), the conditional comparing part 110*c* compares a bit size of a 2nd block with a bit size of two 3rd blocks (S230). In some cases, in the step S210, if at least one of the bit size of a 1st blocks is less than the bit size of two 2nd blocks corresponding the 1st block among all blocks (b=0 . . . B) of the one level, the step S230 may be performed. This modified condition may be applied to the following step S250 and S270. Like the step S140 to step S180, step S240 to step S280 are performed. The step S270 is represented as the following Formula 4. The step S270** may be repeated until the lowest level (a=5) is reached.

$$S(a-1,b/2)>=S(a,b)+S(a,b+1), \qquad \text{[Formula 4]}$$

where a=0 . . . 5, b=0 . . . B−1,

'a−1' corresponds to level of $i^{th}$ block, 'a' corresponds to level of $i+1^{th}$ block.

The step S210 to the step S280 is implemented by the following C-style pseudo code 2, which does not put limitation on the present invention.

[pseudo code 1]

```
for (a = 0; a <= 5; a++) {           // for all levels
      pbuf = buf[0][0];                // pointer to target buffer
            B = 1 << a;                // block length in level a
            for (b = 0; b < B; b++) {  // for all blocks
                  if (!skip[a][b])     // if block can not be skipped
```

-continued

[pseudo code 1]

```
            size[a][b] = EncodeBlock(x+b*B, buf[a][b]);// encode block and store in buf
        }
        if (a > 0) {                    // if not highest level
            for (b = 0; b < B; b+=2) {
                if (!skip[a][b]) {// compare size of two current blocks with size of one block in level a−1
                if (size[a−1][b/2] > size[a][b] + size[a][b+1]) {// copy two short blocks from current level a into
target buffer
                memcpy(pbuf, buf[a][b], size[a][b]);
                memcpy(pbuf + size[a][b], buf[a][+1], size[a][b+1]);
                pbuf += size[a][b] + size[a][b+1]; // increment target buffer
                }
                else {
                pbuf += size[a−1][b/2];         // increment target buffer
                // all subordinate shorter blocks in lower levels can be skipped
                for (aa = a+1; aa <= 5; aa++) // for all lower levels
                    for (bb = (aa−a)*2*b; bb<(aa−a)*2*(b+1); b++)        // for all subordinate blocks
                    skip[aa][bb] = 1;   // set skipping flag
                    }
                }
                else
                    pbuf += GetSkippedSize( );   // increment target buffer (add size of skipped
blocks)
            }
        }
}
```

Figure 11:
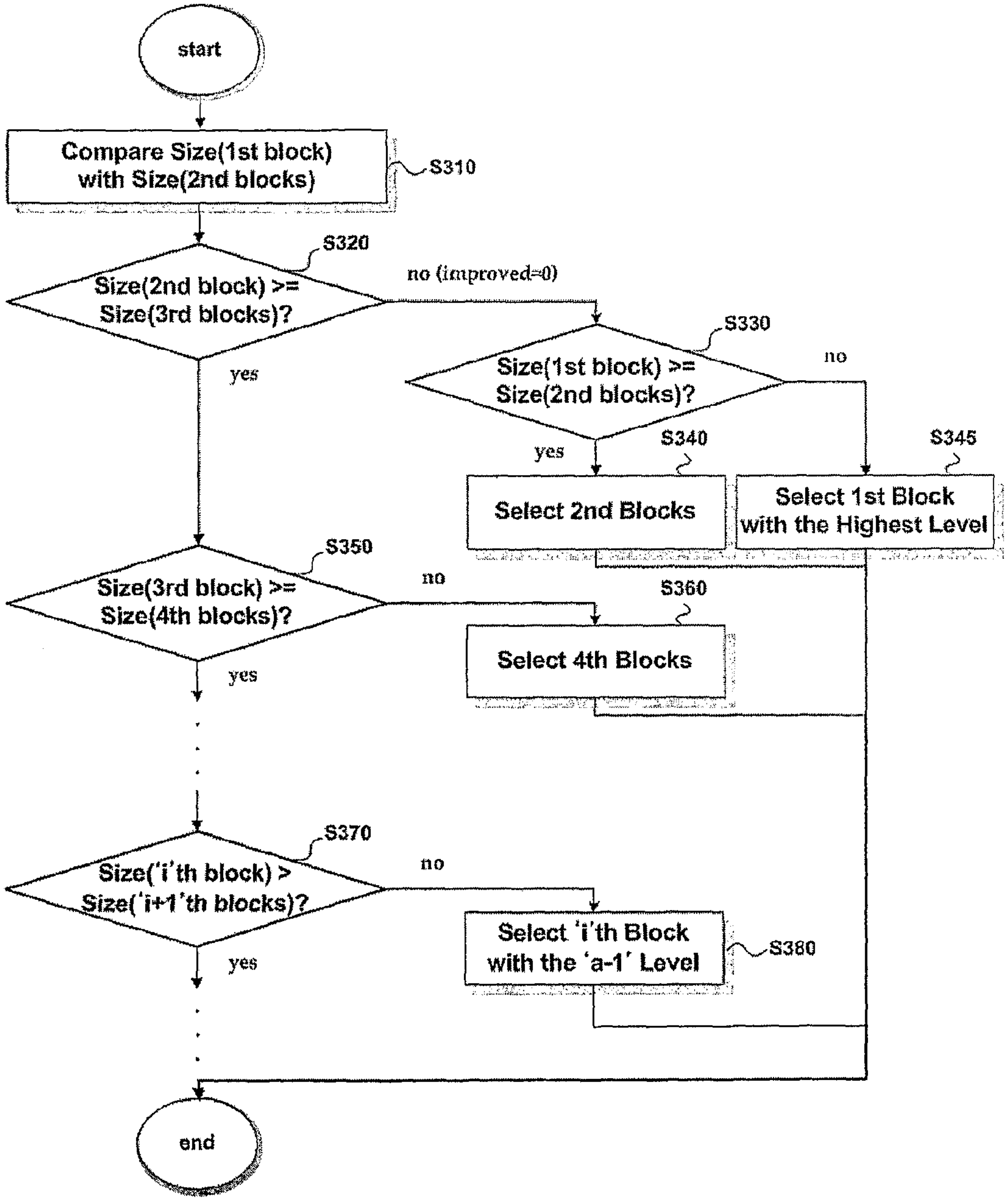
FIG. 11 is an exemplary flowchart of a block switching method for processing an audio signal according to a variation of another embodiment of the present invention.
Figure 12:
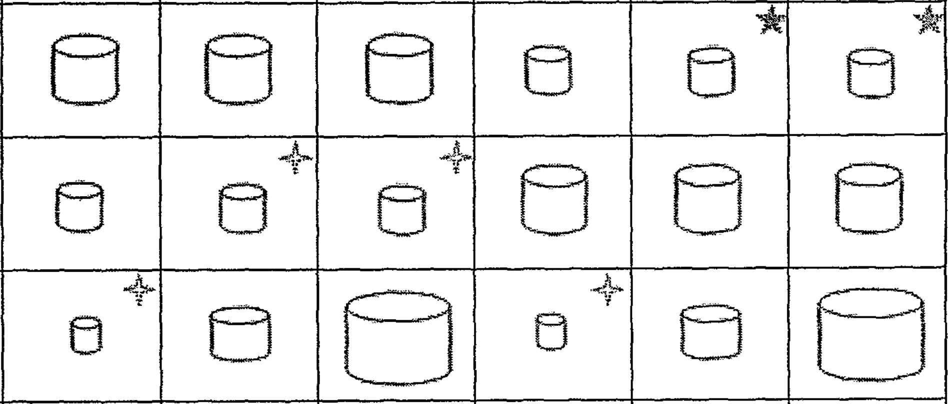
FIG. 12 is an exemplary diagram to explain a concept of FIG. 11.

FIG. 11 is an exemplary flowchart of a block-switching method for processing an audio signal according to a variation of another embodiment of the present invention and FIG. 12 is an exemplary diagram to explain a concept of FIG. 11. In particular, the variation of another embodiment corresponds to extended top-down method that stop only if a block does not improve for two levels instead of one level. This is the main deference to the foregoing top-down method described with reference to the FIG. 10, which stop if a block does not improve for just one level.

Referring to FIG. 4 and FIG. 11, the initial comparing part 110*b* compares a bit size of a 1$^{st}$ block (at the top level) with a bit size of a 2$^{nd}$ block like the step S210 (S310). Regardless comparison results of the step S310, the initial comparing part 110*b* compares a bit size of a 2$^{nd}$ block with a bit size of two 3$^{rd}$ blocks (S320 and S370). If the bit size of the 1$^{st}$ block is less than the bit size of 2$^{nd}$ blocks ('no' in the S310) and the bit size of the 2$^{nd}$ block is less than the bit size of two 3$^{rd}$ blocks ('no' in step S320) (see 'CASE E' and 'CASE F' in FIG. 12), i.e., 1$^{st}$ block is more beneficial than 2$^{nd}$ blocks and 3$^{rd}$ blocks, the initial comparing part 110*b* selects 1$^{st}$ block as optimum block (S330), and comparison at next level is stopped (see 'CASE F' in FIG. 12, especially, see the star with five point). Otherwise, i.e., if the bit size of the 2$^{nd}$ block is equal to or greater than the bit size 3$^{rd}$ blocks ('yes' in step S320), the initial comparing part 110*b* decides whether to select 1$^{st}$ block or compare at next level based on the comparison result of 1$^{st}$ block and 3$^{rd}$ blocks. In particular, if the 1$^{st}$ block is more beneficial than 3$^{rd}$ blocks ('no' in step S340), the initial comparing part 110*b* selects 1$^{st}$ block (S350) (see 'CASE E' in FIG. 12, especially, see the star with five point). Otherwise ('yes' in step S340), the conditional comparing part 110*c* compare 3$^{rd}$ block with 4$^{th}$ blocks, and compare 4$^{th}$ block with 5$^{th}$ blocks, then select the most beneficial block among 3$^{rd}$ block, 4$^{th}$ blocks, and 5$^{th}$ blocks (S360) (see 'CASE D' in FIG. 12).

Meanwhile, if the bit size of the 2$^{nd}$ block is equal to or greater than the bit size of two 3$^{rd}$ blocks ('yes' in step S320) and the bit size of the 1$^{st}$ block is equal to or greater than the bit size of 2$^{nd}$ blocks ('yes' in the S310) and if the bit size of the 2$^{nd}$ block is less than 3$^{rd}$ blocks ('no' in the step S370) (see 'CASE B' and 'CASE C' in FIG. 12), the conditional comparing part 110*c* select the 2$^{nd}$ block temporarily (see the star with four point in 'CASE B' and 'CASE C') and compare at next level (S380). Otherwise, i.e., 3$^{rd}$ blocks is less than the 1$^{st}$ block and the 2$^{nd}$ blocks ('yes' in S370) (see 'CASE A' in FIG. 12), the conditional comparing part 110*c* select the 3$^{rd}$ block temporarily (see the star with four point in 'CASE A') and compare 3$^{rd}$ block with 4$^{th}$ block, and compare 4$^{th}$ block with 5$^{th}$ blocks.

[Long-Term Prediction (LTP)]

Most audio signals have harmonic or periodic components originating from the fundamental frequency or pitch of musical instruments. Such distant sample correlations are difficult to remove with a short-term forward-adaptive predictor, since very high orders would required, thus leading to an unreasonable amount of side information. In order to make more efficient use of the correlation between distant samples, a long-term prediction may be performed.

Figure 13:
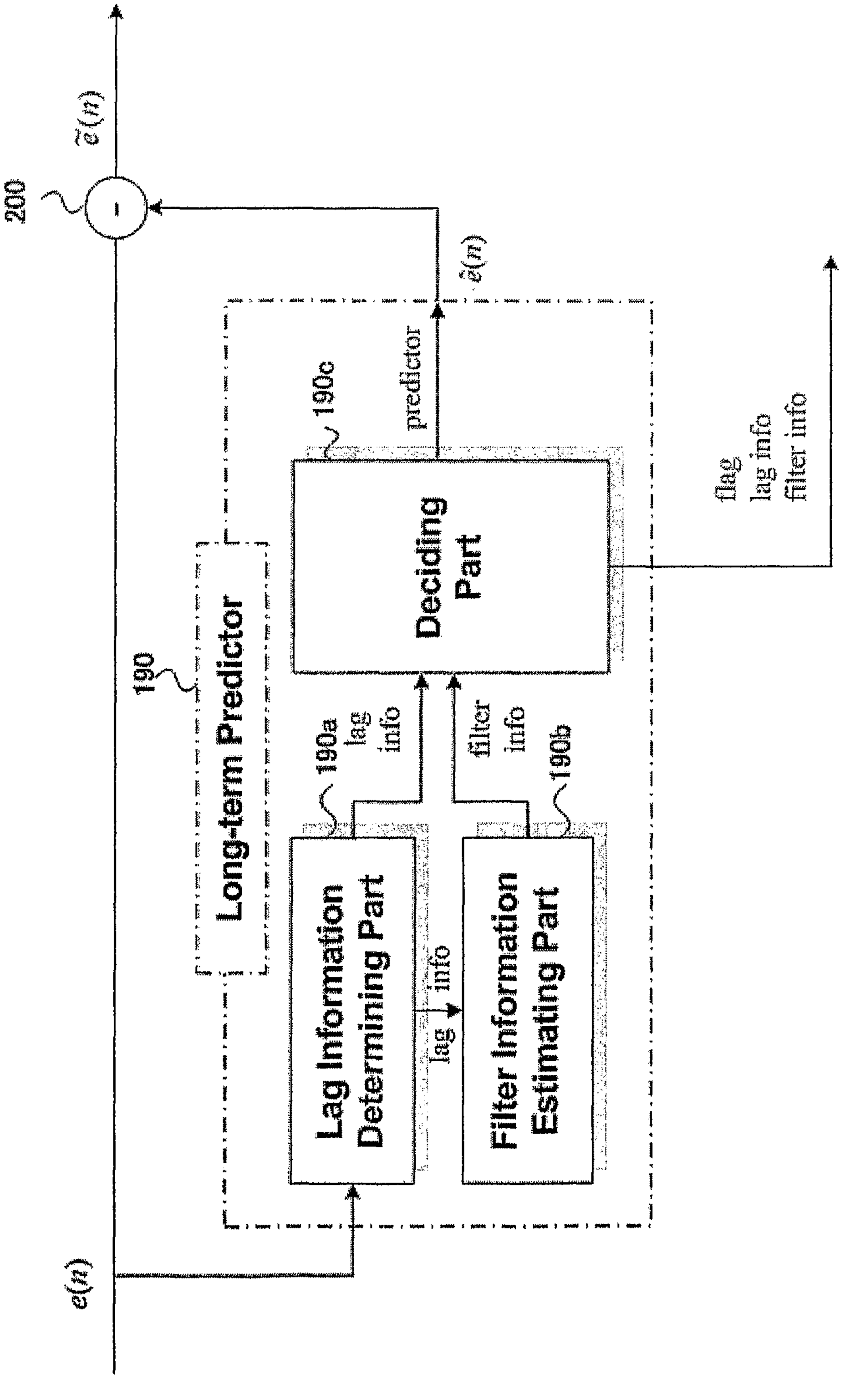
FIG. 13 is an exemplary block diagram of a long-term prediction apparatus for processing an audio signal according to embodiment of the present invention.
Figure 14:
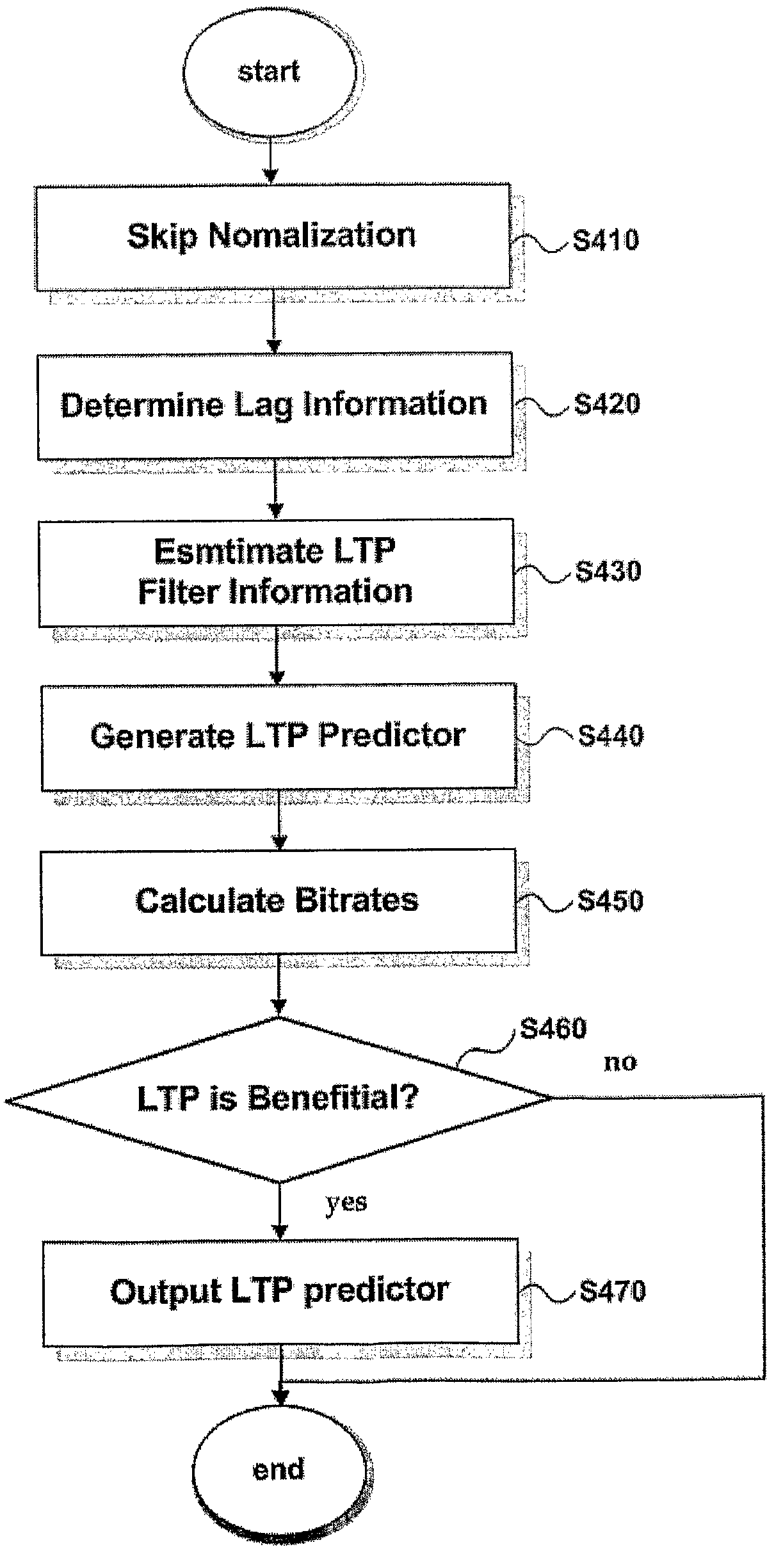
FIG. 14 is an exemplary flowchart of a long-term prediction method for processing an audio signal according to embodiment of the present invention.

FIG. 13 is an exemplary block diagram of a long-term prediction apparatus for processing an audio signal according to embodiment of the present invention, and FIG. 14 is an exemplary flowchart of a long-term prediction method for processing an audio signal according to embodiment of the present invention. Referring to the FIG. 13, a long-term predictor 190 includes a lag information determining part 190*a*, a filter information estimating part 190*b*, and a deciding part 190*c*, the long-term predictor 190 generates the long-term predictor ê(n) using the inputted short-term residual e(n). In brief, the long-term predictor ê(n) and long-term residual ẽ(n) may be calculated according to the following Formula 5, which does not put limitation on the present invention.

[Formula 5]

$$\tilde{e}(n) = e(n) - \hat{e}(n) = e(n) - \sum_{j=-2}^{2} \gamma_j \cdot e(n - \tau - j)$$

where τ denotes the sample lag, $\gamma_j$ denotes the quantized LTP filter coefficients, and ẽ(n) denotes the new residual after long-term prediction. The long-term prediction processing is explained with reference to the FIG. 13, and FIG. 14.

Referring to the FIG. 13 and FIG. 14, the long-term predictor 190 skips the following normalization of input signal (S410).

$$e_{norm}(n) = e(n)\cdot\frac{\sqrt{\overline{|e(n)|}}}{1+5\cdot\sqrt{\overline{|e(n)|}}},$$ [Formula 6]

where $\overline{|e(n)|}$ is the arithmetic mean of absolute values. If the normalization of input values is omitted, long-term prediction complexity may be reduced. However, if the employs random access, normalization should still be used in order to avoid suboptimum compression.

Then, the lag information determining part 190*a* determines lag information τ using autocorrelation function (S420). The autocorrelation function (ACF) is calculated using the following Formula 7.

$$r_{ee}(\tau) = \sum_{n=0}^{N-1} e(n)\cdot e(n-\tau), \text{ for } \tau = K+1 \ \dots\ K+\tau_{max}$$ [Formula 7]

where K is the short-term prediction order, and $\Delta\tau_{max}$, is the maximum relative lag, with $\Delta\tau_{max}$=256 (e.g. for 48 kHz audio material), 512 (e.g. 96 kHz), or 1024 (e.g. 192 kHz), depending on the sampling rate). Finally, the position of the maximum absolute ACF value $\max|r_{ee}(\tau)|$ is used as the optimum lag τ. Furthermore, instead of the direct ACF calculation, a fast ACF algorithm using the FFT (fast Fourier transform) may be employed. If the ACF algorithm is performed in frequency domain like the FFT, encoding time and complexity is reduced.

Then, the filter information estimating part 190*b* estimates filter information $\gamma_j$ using the Wiener-Hopf equation based on stationarity (S430). The non-stationary version of Wiener-Hopf equation is Formula 8.

$$\begin{bmatrix} r(\tau-2,0)\\ r(\tau-1,0)\\ r(\tau,0)\\ r(\tau+1,0)\\ r(\tau+2,0)\end{bmatrix} = \begin{bmatrix} r(\tau-2,\tau-2) & r(\tau-2,\tau-1) & r(\tau-2,\tau) & r(\tau-2,\tau+1) & r(\tau-2,\tau+2)\\ r(\tau-1,\tau-2) & r(\tau-1,\tau-1) & r(\tau-1,\tau) & r(\tau-1,\tau+1) & r(\tau-1,\tau+2)\\ r(\tau,\tau-2) & r(\tau,\tau-1) & r(\tau,\tau) & r(\tau,\tau+1) & r(\tau,\tau+2)\\ r(\tau+1,\tau-2) & r(\tau+1,\tau-1) & r(\tau+1,\tau) & r(\tau+1,\tau+1) & r(\tau+1,\tau+2)\\ r(\tau+2,\tau-2) & r(\tau+2,\tau-1) & r(\tau+2,\tau) & r(\tau+2,\tau+1) & r(\tau+2,\tau+2)\end{bmatrix}\cdot\begin{bmatrix}\gamma_{-2}\\ \gamma_{-1}\\ \gamma_0\\ \gamma_1\\ \gamma_2\end{bmatrix}$$ [Formula 8]

Thus, the ACF values $r_{ee}(\tau+j, 0)$ and $r_{ee}(\tau+j, \tau+k)$, for j, k=−2 . . . 2, have to be calculated. Since the matrix is symmetric, only the upper right triangular has to be calculated (15 values). However, since the non-stationary version is assumed, the stationary $r_{ee}(\tau)$ values already calculated during the optimum lag search can not be re-used.

Meanwhile, if stationarity, i.e. r(j,k)=r(j−k), hence the stationary version of the Wiener-Hopf equation can be applied:

$$\begin{bmatrix} r(\tau-2)\\ r(\tau-1)\\ r(\tau)\\ r(\tau+1)\\ r(\tau+2)\end{bmatrix} = \begin{bmatrix} r(0) & r(1) & r(2) & r(3) & r(4)\\ r(1) & r(0) & r(1) & r(2) & r(3)\\ r(2) & r(1) & r(0) & r(1) & r(2)\\ r(3) & r(2) & r(1) & r(0) & r(1)\\ r(4) & r(3) & r(2) & r(1) & r(0)\end{bmatrix}\cdot\begin{bmatrix}\gamma_{-2}\\ \gamma_{-1}\\ \gamma_0\\ \gamma_1\\ \gamma_2\end{bmatrix}$$ [Formula 9]

If a direct ACF is used for the determination of the optimum lag, only $r_{ee}(K+1 \dots K+\tau_{max})$ are calculated. In contrast, a fast ACF using the FFT always calculates $r_{ee}(0 \dots N-1)$. Therefore, the values r(0 . . . 4) and r(τ−2 . . . τ+2) required in the stationary Wiener-Hopf equation do not have to be recalculated, but are simply taken from the result of the fast ACF that was already done for the lag search in the step S420.

The deciding part 190*c* generates long-term-predictor ê(n) using the lag information τ determined in the step S420 and the filter information $\gamma_j$ estimated in the step S430 (S440).

Then, the deciding part 190*c* calculates bitrates of the audio signal before encoding the audio signal (S450). In other words, the deciding part 190*c* calculates bitrates of the short-term residual e(n) and the long-term residual ẽ(n) without actually encoding. In particular, in case that the bitrates for Rice Coding are calculated, the deciding part 190*c* may determine optimum code parameters for the residuals e(n), ẽ(n) by means of the function GetRicePara( ) and calculate the necessary bits to encode the residuals e(n), ẽ(n) with defined by the code parameters by means of the function GetRiceBits( ) which does not put limitation on the present invention.

The deciding part 190*c* decides whether long-term prediction is beneficial base on the calculated bitrates in the step S450 (S460). According to the decision in the step S460, if long-term prediction is not beneficial ('no' in the step S460), long-term predication is not performed and the process is terminated. Otherwise, i.e., if long-term prediction is beneficial ('yes' in the step S460), the deciding part 190*c* determines the use of long-term prediction and outputs the long-term predictor (S470). Furthermore, the deciding part 190*c* may encode the lag information τ and the filter information $\gamma_j$ as a side information and set a flag information indicating whether long-term prediction is performed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

Accordingly, the present invention is applicable to audio lossless (ALS) encoding and decoding.

The invention claimed is:

1. A method for processing an audio signal, comprising:
receiving the audio signal; and,
processing the received audio signal, wherein the audio signal is processed according to a scheme comprising:
comparing a size information of at least two blocks of A+1 level with a size information of a block of A level corresponding to the at least two of A+1 level; and,
determining the at least two blocks of A+1 level as an optimum block if the size information of the at least two blocks of A+1 level is less than the size information of the block of A level, and determining the block of A level as the optimum block if the size information of the block of A level is less than the size information of the at least two blocks of A+1 level.

2. The method of claim 1, wherein the size information corresponds to one of a coding result, a bit size, and a coded data block.

3. The method of claim 1, wherein the block of A level corresponds to a combination of at least two the blocks of A+1 level.

4. The method of claim 3, wherein the hierarchical structure have at least two levels, and block length of a highest level corresponds to integral multiple of block length of a lowest level.

5. The method of claim 4, wherein the hierarchical structure have six levels, and the block length of the highest level corresponds to 32 multiple of the block length of the lowest level.

6. The method of claim 1, wherein the size information of at least two blocks of A+1 level corresponds to a sum of a size of one block of A+1 level and a size of next block of A+1 level.

7. The method of claim 1, further comprising: comparing a size information of at least blocks of A level with a size information of a block of A−1 level if the size information of the at least two blocks of A+1 level is greater than the size information of the block of A level.

8. The method of claim 7, further comprising: determining the at least two blocks of A level as an optimum block if the size information of the at least two blocks of A level is less than the size information of the block of A−1 level.

9. A non-transitory computer-readable medium having instructions stored thereon, which causes the processor to perform operations, comprising:
comparing a size information of at least two blocks of A+1 level with a size information of a block of A level corresponding to the at least two of A+1 level; and,
determining the at least two blocks of A+1 level as an optimum block if the size information of the at least two blocks of A+1 level is less than the size information of the block of A level, and determining the block of A level as the optimum block if the size information of the block of A level is less than the size information of the at least two blocks of A+1 level.

10. An apparatus for processing an audio signal, comprising:
a initial comparing part comparing a size information of at least two blocks of A+1 level with a size information of a block of A level corresponding to the at least two of A+1 level; and,
a conditional comparing part determining the at least two blocks of A+1 level as an optimum block if the size information of the at least two blocks of A+1 level is less than the size information of the block of A level, and determining the block of A level as the optimum block if the size information of the block of A level is less than the size information of the at least two blocks of A+1 level.

11. The method of claim 1 further comprising:
determining lag information based on autocorrelation function of the audio signal including the optimum block; and,
estimating long-term prediction filter information based on the lag information.

12. The method of claim 11, further comprising:
estimating bitrates of the audio signal after estimating the long-term prediction filter information; and
encoding the lag information and the long-term prediction filter information as a side information based on the estimated bitrates.

13. The apparatus of claim 10 further comprising:
a lag information determining part determining lag information based on autocorrelation function of the audio signal including the optimum block; and,
a filter information estimating part estimating long-term prediction filter information based on the lag information.

* * * * *